United States Patent Office 3,663,494
Patented May 16, 1972

3,663,494
STABILISED TITANIUM DIOXIDE FOR POLY-CARBONATE MOULDING COMPOSITIONS
Gerhard Kienast and Gunter Peilstocker, Krefeld, Hans G. Volz, Krefeld-Bockum, and Wolfgang Wiegreffe, Krefeld, Germany, assignors to Farbenfabriken Bayer Aktiengesellschaft, Leverkusen, Germany
No Drawing. Filed Oct. 29, 1970, Ser. No. 85,286
Claims priority, application Germany, Nov. 22, 1969, P 19 58 665.3
Int. Cl. C08g 51/04
U.S. Cl. 260—37 PC  3 Claims

ABSTRACT OF THE DISCLOSURE

Rutile pigments for colouring polycarbonate moulding compositions which have an improved light stability by incorporating into the $TiO_2$ 0.2 to 5% by weight of zinc oxide and by coating the calcined pigment with aluminium phosphate.

---

Polycarbonates, like other thermoplastic plastics, such as polystyrene, polymethyl methacrylate, polyolefins, polyacetals, polysulphones, polyamides and polyphenylene oxide, are usually dyed in a number of colours, for example by means of inorganic or organic pigments or mixtures thereof. Titanium dioxide pigments frequently form an important part of the colouring formulation in the case of covered or translucent shades, especially in the case of light or white coloured finishes. For example, substantially white colour finishes can be obtained, solely by using titanium dioxide pigments. Almost any shades, essentially however somewhat lighter to pale colours, can be obtained in cases where organic or inorganic coloured pigments are used in admixture with $TiO_2$. A large number of special titanium dioxide pigments with specific properties has been produced for pigmenting plastics. Unfortunately, it has been found that, in spite of their outstanding optical properties in other plastics, conventional pigments show certain drawbacks in the pigmenting of polycarbonates.

High molecular weight thermoplastic polycarbonates of dihydric phenols in the context of this invention include the conventional polycarbonates which are prepared from dihydric phenols such as resorcinol, hydroquinone, dihydroxy diphenyls and especially bis-(hydroxyphenyl)-alkanes, halogenated bis-(hydroxyphenyl)-alkanes such as 4,4′-dihydroxy-3,5,3′,5′-tetrachlorodiphenyl-2,2 - propane or 4,4′-dihydroxy-3,5,3′,5′-tetrabromodiphenyl-2,2 - propane, bis-(hydroxyphenyl)-cycloalkanes, sulphones, sulphoxides, ethers and sulphides, optionally in admixture with glycols, with carbonic acid derivatives such as diesters and dihalides, optionally together with small quantities of dicarboxylic acids or their ester-forming derivatives, and which have an average molecular weight of at least about 10,000 and preferably of from 25,000 to 200,000.

Pigments such as, for example, titanium dioxide pigments can be incorporated in the thermoplastic high molecular weight polycarbonates in quantities of from about 0.05 to 5% by weight, and more particularly in quantities of up to about 2% weight, by the usual methods, for example by scattering the pigment on to the plastics granulate followed by homogenisation, for example in a screw extruder. The pigmented granulate can be converted into mouldings by the conventional methods, for example by injection moulding.

A troublesome yellow tinge and a correspondingly reduced degree of whiteness is frequently observed in polycarbonate moulding compositions or in circular discs obtained from them by injection moulding which has been prepared with conventional titanium dioxide pigments in the manner just described. Under natural weather conditions and even under artificial light, the yellow tinge usually increases to the further detriment of whiteness. In the case of titanium dioxide pigments with differences in regard to their optical properties, this can result following incorporation into polycarbonates in the formation of products with differences in the yellow tinge and also in the degree of whiteness corresponding to the optical properties of the pigment.

The foregoing observations are illustrated in more detail by the following tests:

Three conventional titanium dioxide pigments A, B and C were each incorporated in quantities of 1.5% by weight in polycarbonate of bisphenol A (cf. Example 2), and circular discs injection moulded from the resulting compositions. The discs were tested in a Zeiss Elrepho with the three colour-measuring filters, and the following optical characteristics determined from the values $R_x$, $R_y$, $R_z$:

TABLE 1

|  | A | B | C |
|---|---|---|---|
| Yellow tinge $R_x-R_z$ | 12.40 | 11.19 | 10.91 |
| Whiteness according to Berger* | 13.2 | 16.0 | 16.3 |

*$R_y/3-(R_x-R_z)$, A. Berger, Die Farbe 8 (1959), No. 4/6, 187–202.

In addition, the circular discs were exposed on a rotary filter to the light of 6 ultraviolet lamps arranged at intervals of 10 cm. This exposure to ultraviolet light lasted for 8 hours, Elrepho measurements being taken at hourly intervals. By comparing the results set out in the Tables 1 and 2, it is possible to detect a clear increase in the yellow tinge and a drastic reduction in the degree of whiteness after exposure:

TABLE 2

|  | A | B | C |
|---|---|---|---|
| After 8 hours' exposure: |  |  |  |
| Yellow tinge $R_x-R_z$ | 16.8 | 15.1 | 14.6 |
| Whiteness according to Berger | 8.7 | 11.8 | 12.1 |

Surprisingly, it has been found that these troublesome facts, namely the initial yellow tinge and the increasing degree of yellowing on exposure to light, can be suppressed or at least reduced to a negligible extent by preparing pigmented polycarbonate moulding compositions using titanium dioxide rutile pigments which contain zinc oxide and which in addition have been after-treated with aluminium phosphate. Modified zinc-containing titanium dioxide rutile pigments of this kind provided with an aluminium phosphate shell an be obtained, for example, by a process, of the kind described in U.S. patent specification No. 3,330,798 or British patent specification No. 1,029,783 which are incorporated herein by way of reference.

In one advantageous embodiment of the process for the production of the pigments used in accordance with the invention, zinc oxide is added to the titanium dioxide in aqueous suspension before calcination in a quantity of from 0.2 to 5% by weight, and preferably in a quantity of from 0.5 to 1.5% by weight, based on the $TiO_2$. The suspension is then filtered and calcined. The calcined pigment is ground in the usual way and suspended in water. The pigment suspension is after-treated with a sodium phosphate and aluminium salt solution, the quantities being adjusted in such a way that, based on the $TiO_2$, the completed pigment has an aluminium oxide content of from 0.2 to 5% by weight, preferably from 1 to 2.5% by weight, and a phosphorus pentoxide content of from 0.3 to 6% by weight, and preferably from 1 to 3% by weight. The aluminium phosphate is precipitated by adjusting the pH to a value of from about 7 to 8 through the addition of an alkali such as sodium hydroxide. The pigment thus after-treated is then filtered off, washed and dried. Drying is preferably carried out at a temperature of from 150 to 200° C.

The modified rutile pigment used in accordance with the invention is added to the polycarbonate in an quantity of from 0.05 to 5% by weight, and preferably in a quantity of from 0.5 to 2% by weight.

Moulding compositions prepared with the titanium dioxide used in accordance with the invention are surprisingly very light almost white in colour and, even after prolonged exposure, show only a very limited tendency towards yellowing.

The invention is illustrated in the following examples:

EXAMPLE 1

Following the addition of an aqueous suspension of ZnO to a titanium dioxide aquate suspension prepared in the conventional manner by the sulphate process, a rutile pigment containing 1.2% of ZnO, based on $TiO_2$, was prepared by calciation. The dry-ground pigment was then made into a 25% suspension with water and the resulting suspension was heated to 60° C. An aqueous solution of disodium hydrogen phosphate containing 60 g. of $P_2O_5$ per litre of an aluminium sulphate solution containing 10 g. of $Al_2O_3$ per litre were then simultaneously added with vigorous stirring over a period of 45 minutes, so that the quantity of $P_2O_5$ added amounted to 2% and the quantity of $Al_2O_3$ added to 1.4%, both based on $TiO_2$. The pH was adjusted to a value of from 7.5 to 7.7 over a period of 30 minutes with 50% sodium hydroxide, stirring continued for another 19 minutes, the pigment thus treated filtered off and the filter cake washed with 10 times the quantity by weight of water at 80° C. The washed filter cake was dried for 7 hours at 150 to 200° C. and then micronised in a jet mill powered by superheated steam.

EXAMPLE 2

1.5 parts by weight of a zinc-oxide-containing titanium dioxide rutile pigment obtained by the conventional processes were incorporated by means of an extruder at 270° C. in a melt of 98.5 parts by weight of polycarbonate of 4,4'-dihydroxydiphenyl-2,2-propane (bisphenol A) and phosgene (prepared in the usual way, relative viscosity 1.30 as measured on a 0.5% solution in methylene chloride at 25° C.).

A white coloured polycarbonate is obtained, being size-reduced into granulate and then injection moulded at 300° C. in circular discs 120 mm. in diameter.

The following results were obtained from a free-weathering test:

TABLE 3

|  | Free-weathering | |
|---|---|---|
|  | After 3 months | After 12 months |
| Pigment according to Example 2: yellow tinge |  |  |
| $R_x - R_z$ | 7.32 | 10.63 |
| Whiteness according to Berger [1] | 20.80 | 17.32 |

[1] $\frac{R_y}{3}(R_x - R_z)$.

EXAMPLE 3

1.5 parts by weight of a pigment according to Example 1 were incorporated by means of an extruder at 270° C. into a melt of 98.5 parts by weight of polycarbonate of 4,4'-dihydroxydiphenyl-2,2-propane (bisphenol A) and phosgene (prepared in the usual way, relative viscosity 1.30, as measured on a 0.5% solution in methylene chloride at 25° C.). A white coloured polycarbonate is obtained which is size-reduced into a granulate and then injection moulded at 300° C. into circular discs 120 mm. in diameter.

The following results were obtained from a free-weathering test:

TABLE 3

|  | Free-weathering | |
|---|---|---|
|  | After 3 months | After 12 months |
| Pigment according to Example 3: yellow tinge |  |  |
| $R_x - R_z$ | 6.37 | 9.27 |
| Whiteness according to Berger [1] | 22.13 | 19.04 |

[1] $\frac{R_y}{3}(R_x - R_z)$.

EXAMPLE 4

1.5 parts by weight of a zinc-oxide-containing titanium dioxide rutile pigment prepared by conventional methods were incorporated through an extruder at 270° C. in a melt of 98.5 parts by weight of polycarbonate of 4,4'-dihydroxydiphenyl-2,2-propane (bisphenol A) and diphenyl carbonate (prepared in the usual way, relative viscosity 1.30, as measured on a 0.5% solution in methylene chloride at 25° C.).

A white coloured polycarbonate is obtained which is size-reduced into a granulate and injection moulded at 300° C. into circular discs 120 mm. in diameter.

The following results were obtained from short-term and free-weathering tests:

TABLE 5

|  | Exposure on a rotary filter | | Free-weathering | |
|---|---|---|---|---|
|  | Before exposure | After exposure | After 3 months | After 12 months |
| Pigment according to Example 4: yellow tinge |  |  |  |  |
| $R_x - R_z$ | 12.3 | 15.8 | 11.10 | 17.17 |
| Whiteness according to Berger [1] | 13.2 | 8.7 | 16.85 | 10.35 |

[1] $\frac{R_y}{3}(R_x - R_z)$.

EXAMPLE 5

1.5 parts by weight of a titanium dioxide pigment according to Example 1 were incorporated through an extruder at 270° C. into a melt of 98.5 parts by weight of polycarbonate of 4,4'-dihydroxydiphenyl-2,2-propane (bisphenol A) and diphenyl carbonate (prepared in the usual way, relative viscosity 1.30, as measured on a 0.5% solution in methylene chloride at 25° C.).

A white coloured polycarbonate is obtained which is size-reduced into a granulate and injection moulded at 300° C. into circular discs 120 mm. in diameter.

The following results were obtained from short-term and free-weathering tests:

TABLE 6

| | Exposure on a rotary filter | | Free-weathering | |
| --- | --- | --- | --- | --- |
| | Before exposure | After exposure | After 3 months | After 12 months |
| Pigment according to Example 5: yellow tinge $R_x-R_z$ | 6.9 | 12.6 | 8.78 | 13.87 |
| Whiteness according to Berger [1] | 20.1 | 14.2 | 19.58 | 14.13 |

[1] $\frac{R_y}{3}(R_x-R_z)$

What is claimed is:

1. A colored polycarbonate moulding composition comprising a polycarbonate and 0.05 to 5% by weight of a rutile pigment which rutile pigment contains 0.2 to 5% by weight of zinc oxide and an aluminum phosphate coating in an amount corresponding to 0.2 to 5% by weight of aluminum oxide and 0.3 to 6% by weight of phosphorus pentoxide.

2. A composition as claimed in claim 1, wherein the rutile pigment is present in a quantity of from 0.5 to 2% by weight.

3. A composition as claimed in claim 1, wherein the rutile pigment contains 0.5 to 1.5% by weight of zinc oxide and an aluminum phosphorus coating corresponding to 1 to 2.5% by weight of aluminum oxide and 1 to 3% by weight of phosphorus pentoxide.

References Cited

FOREIGN PATENTS 1,213,557  3/1966  Germany _____ 106—300

LEWIS T. JACOBS, Primary Examiner